Oct. 25, 1932.  A. W. MALONE  1,884,037
DEAD END SUPPORTS FOR ELECTRIC CABLES
Filed Nov. 14, 1931    2 Sheets-Sheet 1
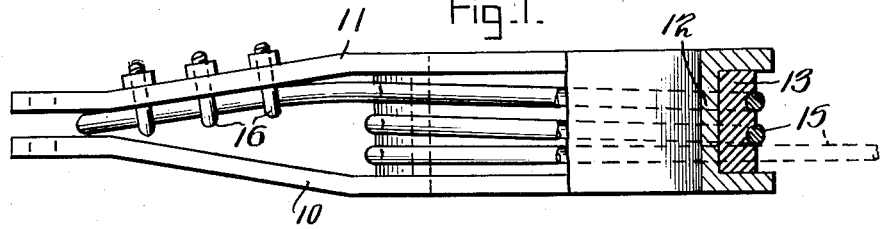
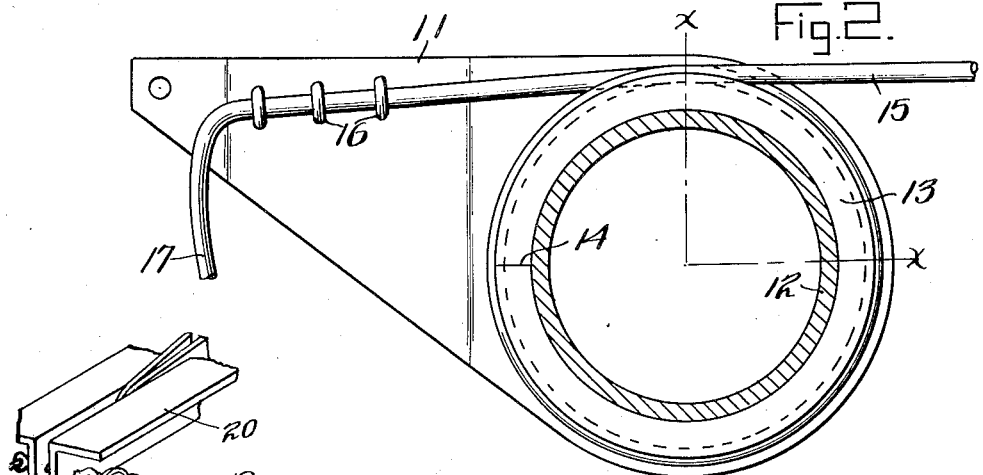
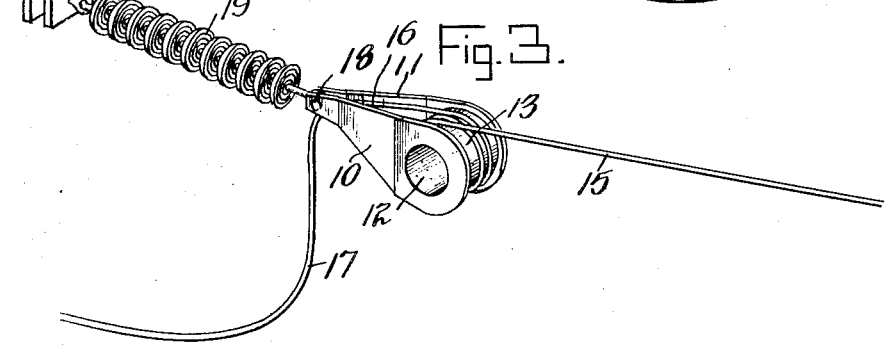
Inventor
Adolph W. Malone

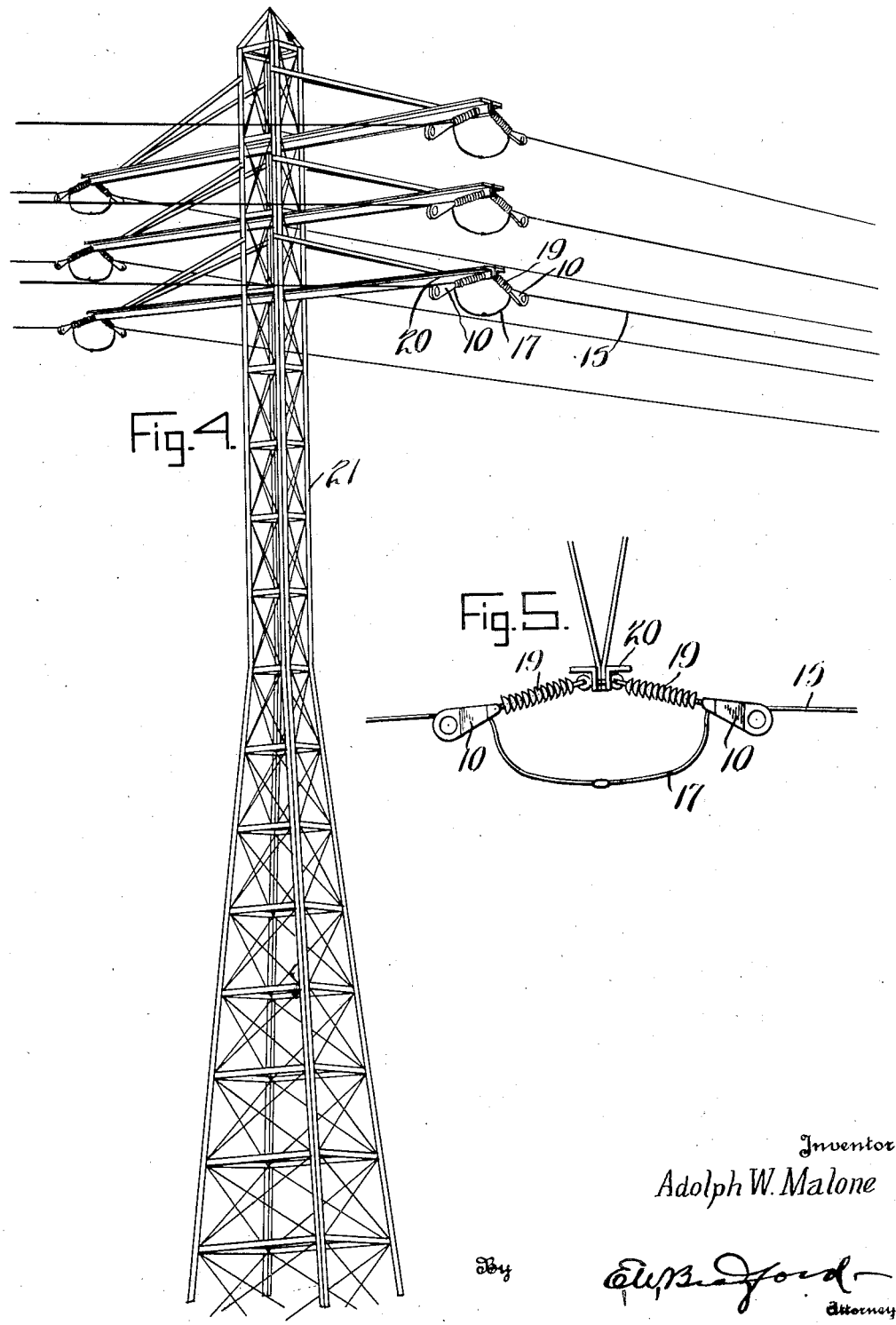

Patented Oct. 25, 1932

1,884,037

UNITED STATES PATENT OFFICE

ADOLPH W. MALONE, OF FILLMORE, UTAH, ASSIGNOR OF ONE-HALF TO ALBERT H. VESTAL, OF ANDERSON, INDIANA

DEAD END SUPPORTS FOR ELECTRIC CABLES

Application filed November 14, 1931. Serial No. 575,130.

This invention relates to supports for electric cables and particularly to means for supporting the dead ends or other ends of such cables.

An object of the invention is to provide a support which will eliminate shocks or vibrations which tend to crystallize and thus break the wire at the point of attachment to the support.

Referring to the accompanying drawings, which are made a part hereof and on which similar reference characters indicate similar parts, Figure 1 is a plan view of a support showing an electric cable attached thereto, Figure 2, a view in elevation of the support, Figure 3, a perspective view of the support and a portion of the wire showing the device in use, Figure 4, a view in elevation of a tower showing cables attached by my device, and Figure 5, a detail showing my device attached to one arm of the tower.

In the drawings numerals 10 and 11 indicate portions of a bracket between the ends of which, or made integral therewith, is a spool 12. Surrounding the spool is a resilient cushion 13 which may be made of any suitable material such as rubber. A cable 15 is wound around the rubber cushion on the spool and is attached by means of bolts or clamps 16 to one of the side brackets. The cable may terminate at the point of attachment in which case the bracket supports the dead end or it may be continued by means of a cable 17 and attached to a similar end of a cable on another bracket, as shown in Figure 5. The ends of the brackets 10 and 11 may be secured as at 18 to an eye in an insulating block 19 which in turn is attached to the end of a cross arm 20 on a tower or pole 21. By reason of the cushion 13 any swaying or vibration of the cable 15 is absorbed without danger of crystallizing or distorting the material of the cable. The cable therefore is not subject to breaking at the point of its support on the bracket. While the brackets may be made of any suitable material either metal or other material I have found it desirable under some circumstances to make these brackets of a relatively light material which has a high tensile strength. The metal known as duraluminum is an example of such metal, however, the invention is in no sense limited to the particular metal of which the clamps are made.

While in Figure 4 the pole or tower is illustrated as carrying only brackets of the kind shown in this application, obviously it may carry some other supports such for example as those shown in my co-pending application filed on even date herewith as well as the dead end supports illustrated.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A support for the end of a cable adapted to be pivoted to an insulating block comprising a bracket having a spool element thereon, said spool being covered with a resilient cushoining material, said cushion being adapted to have a cable wound about it, said cable being attached at its free end to a side of the bracket adjacent said insulating block, substantially as set forth.

2. A support for the end of a cable comprising a bracket having a spool thereon, said spool having a resilient covering upon it, a cable wound about said spool, said bracket being pivotally attached to an insulating block, said cable being attached to a side of the bracket intermediate said pivot point and said spool, substantially as set forth.

3. A support for the end of a cable comprising a bracket having a spool thereon, said spool having a resilient covering upon it, a cable wound about said spool, said bracket adapted to be pivotally attached to an insulating element, the free end of said cable being secured to a side of the bracket between said spool and said insulating element, said bracket being made of a material relatively light in weight but which has a high tensile strength, substantially as set forth.

4. A support for the end of a cable comprising a bracket having a spool thereon, said spool having a resilient covering upon it and a cable wound about said spool, said bracket adapted to be pivotally attached to a stationary insulator, said cable being secured at its free end to a side of said bracket intermediate said spool and said pivotal point, said bracket being made of duraluminum, substantially as set forth.

5. A device for dead ending a long span of wire comprising a bracket having a spool secured at one end and adapted to be pivotally attached at the other to an insulating member, the free end of said wire being wound about said spool and means positioned intermediate said pivotal point and said spool for securing said end in fixed position, said spool being covered with a resilient material for cushioning the effect due to movement of said span of wire and to prevent injury thereto, substantially as set forth.

In witness whereof, I have hereunto set my hand at Washington, District of Columbia, this twenty-second day of October, A. D. nineteen hundred and thirty-one.

ADOLPH W. MALONE.